UNITED STATES PATENT OFFICE.

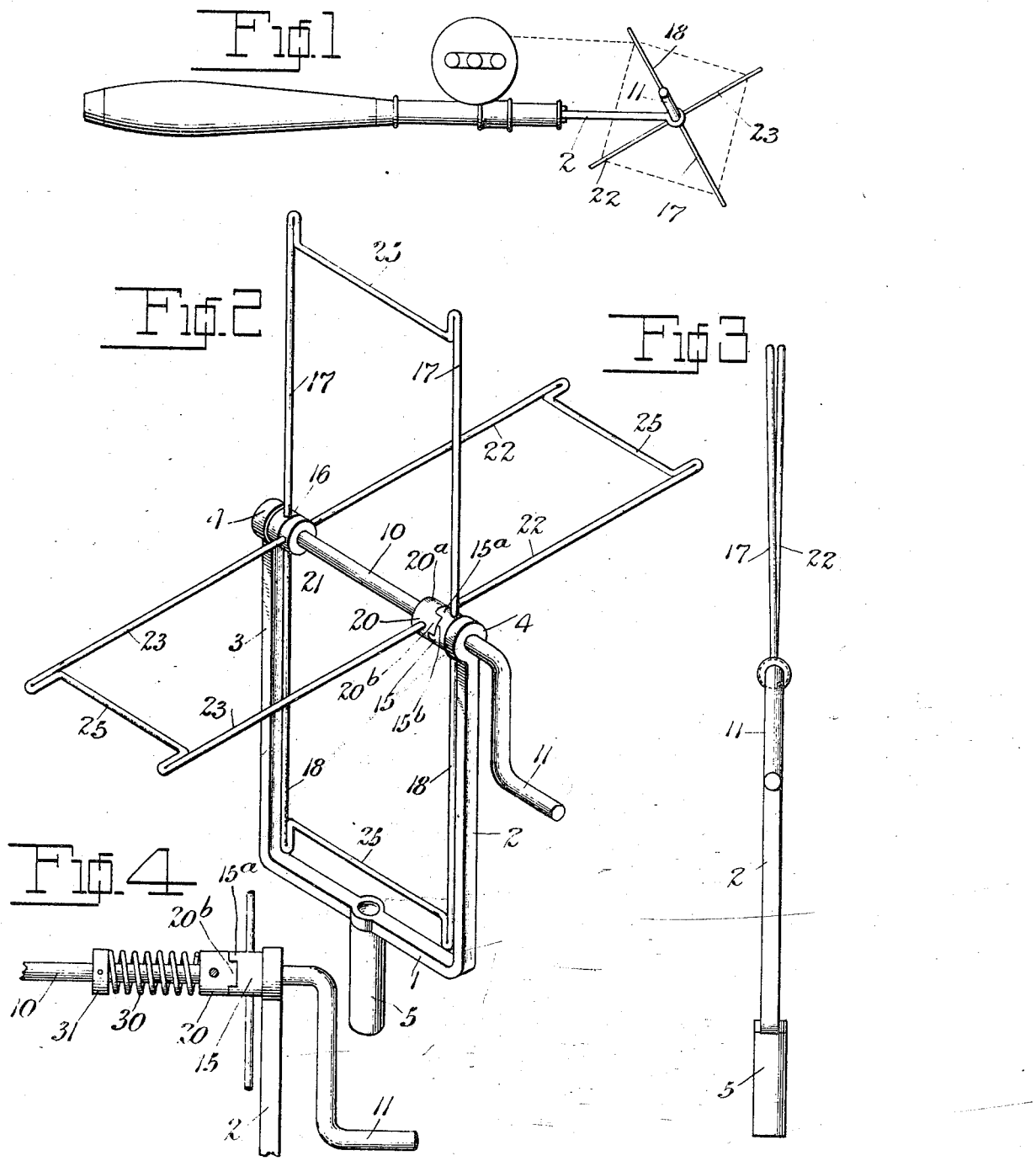

EGBERT SPENCER, OF BEEKMAN, NEW YORK, ASSIGNOR TO VON LENGERKE AND DETMOLD, OF NEW YORK, N. Y., A COPARTNERSHIP.

LINE-DRYING REEL.

987,411.  Specification of Letters Patent.  Patented Mar. 21, 1911.

Application filed July 6, 1910. Serial No. 570,589.

*To all whom it may concern:*

Be it known that I, EGBERT SPENCER, a citizen of the United States, and a resident of Beekman, Dutchess county, State of New York, have invented certain new and useful Improvements in Line-Drying Reels, of which the following is a specification.

The object of the present invention is to produce a simple and effective line drying reel that can be readily mounted upon a fish rod section for reeling a line from the fish reel after use.

A further object of the present invention is to produce such a drying reel which can be collapsed into compact shape for convenience in carrying it in the pocket or fishing kit.

The improved line drying reel includes a yoke-shaped support provided with a stem projecting centrally from its base and of proper size and shape to be fitted into the base section of a fish rod when the extension sections of the rod are removed, and a skeleton reel journaled in the arms of said yoke-shaped support in convenient position to be operated by one hand while the fish rod is held in the other. With this arrangement, the end of the line to be dried is tied to one of the arms of the drying reel and with the drag upon the fishing reel is uniformly and rapidly wound upon the drying reel. The form of the reel supporting yoke is such that the drying reel is presented in a most effective position for the accurate winding of the line from the fishing reel to the drying reel. The reel supporting yoke is formed with springy arms so that the hub members of the reel proper are engaged by the arms of the yoke with sufficient braking pressure to hold the reel in any position and avoid the possibility of rotating it too rapidly.

The reel proper is constructed of a shaft journaled in the arms of the yoke-shaped support and having two hub members rigidly attached inside of the support arms and two other hub members freely mounted upon the shaft inside of the fixed hub members, the fixed and loose hub members at one side of the reel being formed with corresponding recesses and projections to lock the loose hub members upon the shaft, and all the hub members having the radial reel arms projecting from them. A spring device is provided for holding the notched loose hub member into locked engagement with the notched fixed hub member. The arms of the reel are preferably formed of spring wire bent into U-shape and suitably mounted in the hub members. The elasticity of the spring wire arms upon the loose hub members may be utilized for retaining the notched loose hub member into engagement with the notched fixed hub member, or I may provide a different form of spring for retaining these parts in engagement. This construction of reel enables me to disengage the two interlocking hub members and rotate the reel arms relatively to collapse them into compact form.

In order that my invention may be fully understood, I will first describe the same with reference to the accompanying drawing, and afterward point out the novelty more particularly in the annexed claims.

In said drawings: Figure 1 is a side elevation of a section of a fishing rod and reel showing my improved drying reel applied thereto in position for reeling a line from the fishing reel. Fig. 2 is an enlarged perspective view of my improved line drying reel. Fig. 3 is an edge view of the same in collapsed form, and Fig. 4 is a detail view of a slight modification.

1 is a yoke-shaped support having parallel arms 2 and 3 which are formed at their free ends with enlargements 4 having transverse journal openings formed through them. The U-shaped yoke 1 is provided with a stem 5 projecting downwardly from the center of its base member. The stem 5 is of cylindrical or slightly tapered form to fit in the socket in the end of the handle section of an ordinary fishing rod to support the reel upon said rod section.

10 is a shaft of the reel journaled in the openings formed through enlargements 4 of arms 2 and 3. This shaft is preferably bent at one end to form a crank handle 11.

Rigidly fastened upon the shaft 10 just inside of the bearing ends 4 of the yoke supporting arms are the fixed hub members 15 and 16 in which are supported the radial reel arms 17 and 18 which extend from the hub members in opposite directions. Loosely mounted upon the shaft 10 inside of the fixed hub members 15 and 16 are the loose hub members 20 and 21 supporting the radial reel arms 22 and 23 which extend from said loose hub members in opposite directions. The reel arms 17, 18, 22 and 23 are preferably formed of springy wire of sufficient stiffness to serve the purpose for which they are intended. These wires are conveniently bent into U-shape with the ends mounted in the hub members and the outer parts of the arms have inwardly bent sections 25 upon which the line may be wound. The fixed hub member 15 has its inner face formed with alternate projections and notches 15ª, 15ᵇ to receive corresponding notches and projections 20ª and 20ᵇ formed upon the outer face of the adjacent loose hub member 20. These notches and projections upon the adjacent hub members 15 and 20 are in effect a clutch for locking the loose member upon the shaft. Since the radial reel arms 22 and 23 are of spring wire, it will be observed that the loose hub member 20 will be yieldingly held in locked engagement with the fixed hub member 15 so as to hold the two sets of reel arms at right angles to each other. I prefer to utilize the spring of reel arms 22 and 23 for holding the hub members 15 and 20 in engagement, but the same result can be obtained by providing an additional spring such as shown in Fig. 4 of the drawing. In this figure, the shaft 10 has a small spiral expansion spring 30 mounted upon it and held in engagement with the loose hub member 20 by a collar 31 secured to the shaft 10.

The U-shaped supporting yoke 1 is preferably formed of spring material so that the arms 2 and 3 will engage the fixed hub members 15 and 16 of the reel with a braking pressure sufficient to hold the reel in its support in any position in which it is placed and at the same time afford a retarding effect to offset the tendency of rotating the reel too rapidly when a line is wound upon it.

In Fig. 1 I have shown my improved line drying reel in operative position, the stem 5 of the supporting yoke being inserted in the socket in the end of the handle section of an ordinary fishing rod. When the reel is mounted in this position, it will be observed that it is presented in the most convenient position in front of the fishing reel for removing a line therefrom. With the rod section held in the left hand, and the drag placed upon the fishing reel, the drying reel can be conveniently operated with the right hand for quickly and uniformly winding the line from the fishing reel to the drying reel. After the drying reel has been used, it can be collapsed into the form shown in Fig. 3 by simply pressing the loose hub 20 inwardly to disengage the projections and notches of the adjacent hub members and relatively rotating the reel arms until they are brought close together. In this form the drying reel is very compact and can be conveniently carried in the pocket or placed in the fishing kit.

What I claim is:

1. In a line drying reel, the combination of a suitable support, a shaft journaled in said support, hub members fixed upon said shaft, other hub members loose upon said shaft, radial arms mounted upon said hub members, clutch faces formed upon one of said fixed hub members and the adjacent loose hub member, and means for yieldingly holding said clutch faces in engagement.

2. In a line drying reel, the combination of a suitable support, a reel shaft journaled in said support, hub members fixed upon said shaft and supporting reel arms, other hub members loosely mounted upon said shaft alongside of said fixed hub members, clutch faces formed upon adjacent fixed and loose hub members, and reel arms of spring material mounted in said loose hub members and tending to hold said clutch members in engagement.

EGBERT SPENCER.

Witnesses:
 EUGENE R. SCHRYVER,
 CORA D. SCHRYVER.